United States Patent
Smith

(10) Patent No.: US 6,725,560 B2
(45) Date of Patent: Apr. 27, 2004

(54) RELEASABLE MARKING ATTACHMENT FOR TAPE MEASURE

(76) Inventor: Braden L. Smith, 3732 Kimberly Dr., Lafayette, IN (US) 47905

( * ) Notice: Subject to any disclaimer, the term of this patent is extended or adjusted under 35 U.S.C. 154(b) by 0 days.

(21) Appl. No.: 09/880,468

(22) Filed: Jun. 13, 2001

(65) Prior Publication Data

US 2002/0011006 A1 Jan. 31, 2002

Related U.S. Application Data

(60) Provisional application No. 60/220,500, filed on Jul. 25, 2000.

(51) Int. Cl.[7] .............................. G01B 3/10; B25H 7/00
(52) U.S. Cl. .............................. 33/668; 33/768; 33/770; 33/189
(58) Field of Search .......................... 33/189, 668, 770, 33/768

(56) References Cited

U.S. PATENT DOCUMENTS

| | | | |
|---|---|---|---|
| 2,621,409 A | 12/1952 | Dvorak | 33/27 |
| 2,651,843 A | 9/1953 | Goodford | 33/27 |
| 2,807,886 A | 10/1957 | Aciego | 33/189 |
| 2,893,122 A | 7/1959 | Greco | 33/27 |
| 3,021,599 A | 2/1962 | Odom | 33/46 |
| 3,063,157 A | 11/1962 | Keene | 33/189 |
| 3,148,455 A | 9/1964 | Aciego | 33/189 |
| 3,262,211 A | 7/1966 | Beckett | 33/189 |
| 3,336,678 A | 8/1967 | Chamberlain et a l. | 33/189 |
| 3,393,454 A | 7/1968 | Creighton | 33/27 |
| 3,479,742 A | 11/1969 | Starkenberg | 33/27 |
| 3,526,964 A | 9/1970 | Clark, Jr. | 33/27 |
| 3,577,641 A | 5/1971 | Smith | 33/27 |
| 3,731,389 A | 5/1973 | King | |
| 3,802,083 A * | 4/1974 | Freed | 33/138 |
| 4,015,337 A | 4/1977 | Taylor | 33/138 |
| 4,023,277 A | 5/1977 | Fizer | 33/27 |
| 4,103,426 A | 8/1978 | Robin | 33/27 |
| D256,340 S | 8/1980 | Spohn, Jr. | D10/74 |
| 4,233,749 A | 11/1980 | Coulter et al. | 33/189 |
| 4,296,554 A | 10/1981 | Hammerstrom | 33/138 |
| 4,439,927 A | 4/1984 | Elliott | 33/189 |
| 4,507,869 A | 4/1985 | Stude | 33/42 |
| 4,542,589 A | 9/1985 | Yamamoto | 33/138 |
| 4,547,973 A | 10/1985 | Owens | 33/27 |
| 4,551,847 A | 11/1985 | Caldwell | 377/27 |
| 4,630,376 A | 12/1986 | Pentecost | 33/138 |
| 4,651,429 A | 3/1987 | Ljungberg et al. | 33/138 |
| 4,667,412 A | 5/1987 | Carlson | 33/138 |
| 4,697,349 A | 10/1987 | Lee | 33/27.03 |

(List continued on next page.)

FOREIGN PATENT DOCUMENTS

| | | |
|---|---|---|
| WO | WO 00/60306 | 10/2000 |
| WO | WO 01/11309 A1 | 2/2001 |

*Primary Examiner*—Christopher W. Fulton
*Assistant Examiner*—Amanda J Hoolahan
(74) *Attorney, Agent, or Firm*—Jackson Walker LLP; Robert C. Klinger

(57) ABSTRACT

An integrated recoiling tape measure with an integral marker secured thereto by a marker holder. The marker holder is uniquely designed to be attached to the side of the tape measure, and is angled in a first direction such that the pencil tip extends forward to the tape holder, and is also angled laterally inward toward the tape itself and proximate the graduations thereof for easy and convenient marking of the material proximate the tape graduations. The present invention achieves technical advantages by allowing a workman to measure and mark and a material with one hand, thus freeing the other hand for holding the material or other tools.

18 Claims, 4 Drawing Sheets

U.S. PATENT DOCUMENTS

| | | | |
|---|---|---|---|
| 4,729,171 A | 3/1988 | Samson | 33/138 |
| 4,760,648 A | 8/1988 | Doak et al. | 33/668 |
| 4,890,393 A | 1/1990 | St. Jean | 33/768 |
| 4,914,830 A | 4/1990 | Legare | 33/668 |
| 4,964,225 A | 10/1990 | Waldherr | 33/768 |
| 4,965,941 A | 10/1990 | Agostinacci | 33/668 |
| 4,976,037 A | 12/1990 | Hines | 33/27.03 |
| D320,570 S | 10/1991 | Lin | D10/72 |
| 5,134,784 A | 8/1992 | Atienza | 33/668 |
| 5,154,006 A | 10/1992 | Wooster | 331/768 |
| 5,172,486 A | 12/1992 | Waldherr | 33/770 |
| 5,197,195 A | 3/1993 | Aikens | 30/293 |
| D336,443 S | 6/1993 | Dickey | D10/74 |
| 5,295,308 A | 3/1994 | Stevens et al. | 33/770 |
| 5,379,524 A | 1/1995 | Dawson | 33/768 |
| 5,416,978 A | 5/1995 | Kaufman | 33/770 |
| 5,435,074 A | 7/1995 | Holevas et al. | 33/668 |
| 5,477,619 A | 12/1995 | Kearns | 33/668 |
| 5,515,617 A | 5/1996 | Canfield | 33/768 |
| D373,734 S | 9/1996 | Doak | D10/74 |
| 5,577,329 A | 11/1996 | States | 33/768 |
| 5,636,821 A * | 6/1997 | Davies | 248/300 |
| 5,671,543 A | 9/1997 | Sears | 33/668 |
| 5,711,085 A | 1/1998 | Adams | 33/768 |
| D390,795 S | 2/1998 | LaFrance | D10/74 |
| 5,735,052 A | 4/1998 | Lin | 33/27.03 |
| 5,782,007 A | 7/1998 | Harris | 33/768 |
| 5,809,662 A | 9/1998 | Skinner | 33/768 |
| 5,815,939 A | 10/1998 | Ruffer | 33/760 |
| 5,829,152 A | 11/1998 | Potter et al. | 33/668 |
| 5,992,038 A | 11/1999 | Harmon et al. | 33/768 |
| 6,041,513 A * | 3/2000 | Doak | 33/668 |
| 6,178,655 B1 * | 1/2001 | Potter et al. | 33/668 |
| 6,223,443 B1 * | 5/2001 | Jacobs | 33/27.03 |
| 6,276,071 B1 * | 8/2001 | Khachatoorian | 33/767 |
| 6,298,562 B1 * | 10/2001 | Duquette | 30/294 |
| 6,324,769 B1 * | 12/2001 | Murray | 33/755 |

* cited by examiner

RELEASABLE MARKING ATTACHMENT FOR TAPE MEASURE

This application claims priority of provisional application Ser. No. 60/220,500 filed Jul. 25, 2000, entitled "Releasable Marking Attachment for Tape Measure", the teachings of which are incorporated herein by reference.

FIELD OF THE INVENTION

The present invention is generally related to the field of hardware tools, and more particularly to measuring devices including tape measures and the like.

BACKGROUND OF THE INVENTION

Measuring tapes, including those having recoiling mechanisms and locking mechanisms, are traditionally used by carpenters as a convenient means for measuring out predetermined distances of materials such as during construction. Typically, the tape measure includes a graduated tape including a metal catch having a 90 degree angle on the end thereof. A locking switch is adapted to secure the tape in a predetermined position during the use thereof, where the release thereof allows the tape to be automatically recoiled into the housing.

Traditionally, one hand holds the tape measure while the other hand marks a material being measured with a pencil at a point corresponding to a desired graduation of the tape. This technique can be very awkward in many situations as a worker finds himself needing a second hand for holding other tools or for supporting the material being measured.

There is desired an improved tape measure apparatus allowing for the selective use of a tape measure and marking therewith using only one hand, freeing the worker's other hand to hold materials or other tools.

SUMMARY OF THE INVENTION

The present invention achieves technical advantages as an integrated recoiling tape measure with an integral marker secured thereto by a marker holder. The marker holder is uniquely designed to be attached to the side of the tape measure, and is angled in a first direction such that the marker tip extends forward of the tape holder, and is also angled laterally inward toward the tape itself and proximate the graduations thereof for easy and convenient marking of the material proximate the tape graduations.

The present invention preferably includes an attachment adapted to secure to the side of the tape measure, including a pencil holder securely extending a pencil forward of the holder and lateral of the tape. The attachment preferably includes a base and a detachable clip, which clip includes a tongue adapted to be received within a commensurate slit of the base. The clip has a carriage holder adapted to receive a marking instrument, such as a pencil, and preferably a carpenter's pencil. The carriage holder includes a set screw for securing the position of the marking utensil with respect to the holder and thus with respect to the tape measure itself.

DETAILED DESCRIPTION OF THE PREFERRED EMBODIMENT AND BEST MODE

Figure 1:
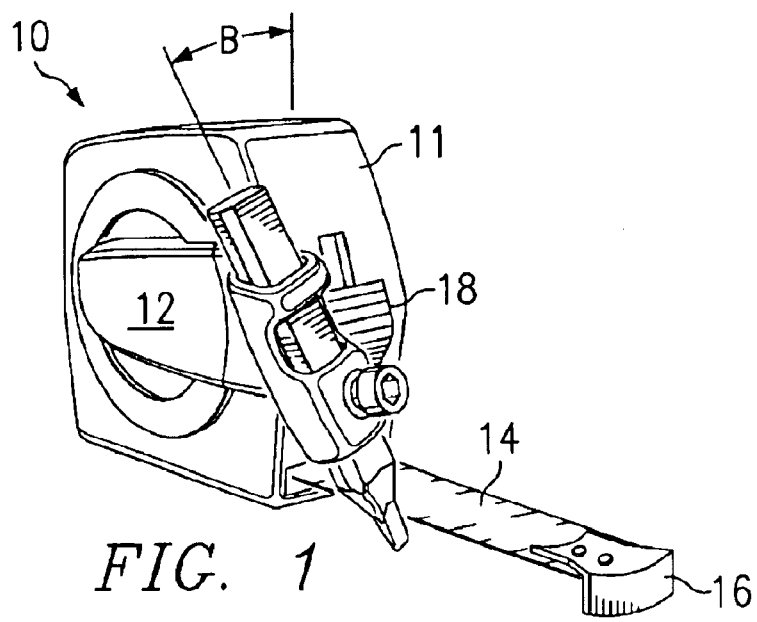
FIG. 1 shows a perspective view of a marking attachment installed on a side of a tape measure.
Figure 2:
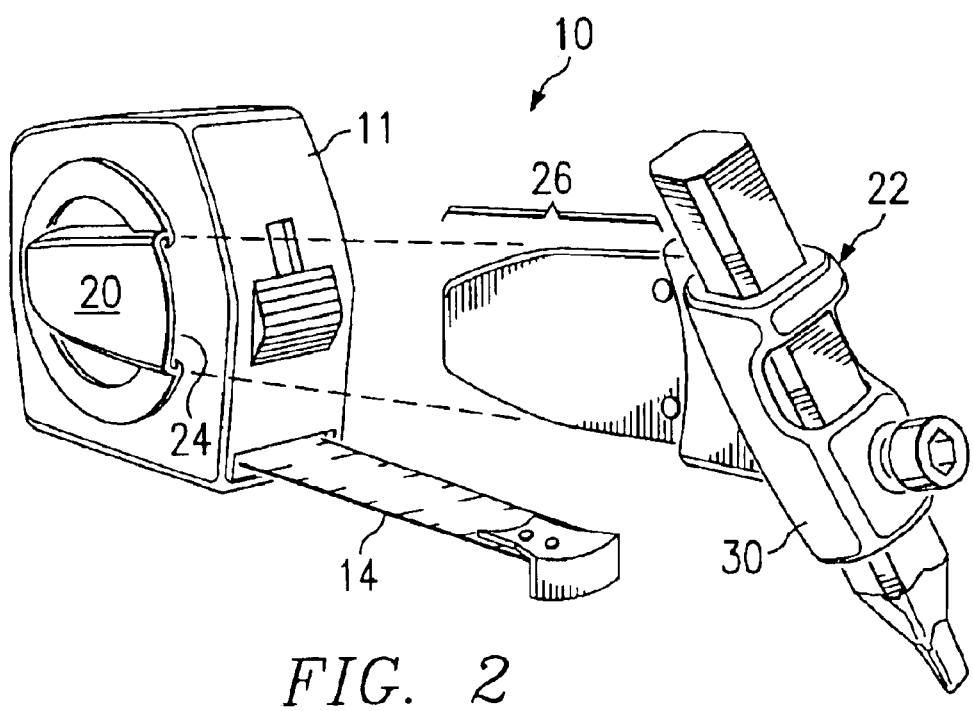
FIG. 2 shows a perspective view of the marking attachment's two main components.

A preferred embodiment of the present invention is illustrated at 10 in FIG. 1 and FIG. 2. Apparatus 10 is shown to include a typical tape measure 11, and an attachment 12 according to the present invention. The tape measure 11 has a recoiling graduated tape 14 with a metal catch 16 on its end. The tape measure 10 also has a locking switch 18 adapted to selectively prevent the tape 14 from recoiling.

As illustrated in FIG. 2, the attachment 12 comprises two main components, a permanent base 20 adapted to secure to the side of tape measure 11 and a removable clip 22. FIG. 1 shows the base 20 and clip 22 coupled together and mounted on the tape measure 11, and FIG. 2 shows the clip 22 separated from the base 20. In the preferred embodiment, the base 20 and clip 22 are made of a durable plastic. However, any durable material may be used, such as a metal. The base 20 has a forward opening slot, port, or groove 24 in which a tapered tab or tongue 26 on the clip 22 may be securely inserted, as shown. Thus, the base 20 and clip 22 may be quickly snapped together or taken apart.

Figure 3:
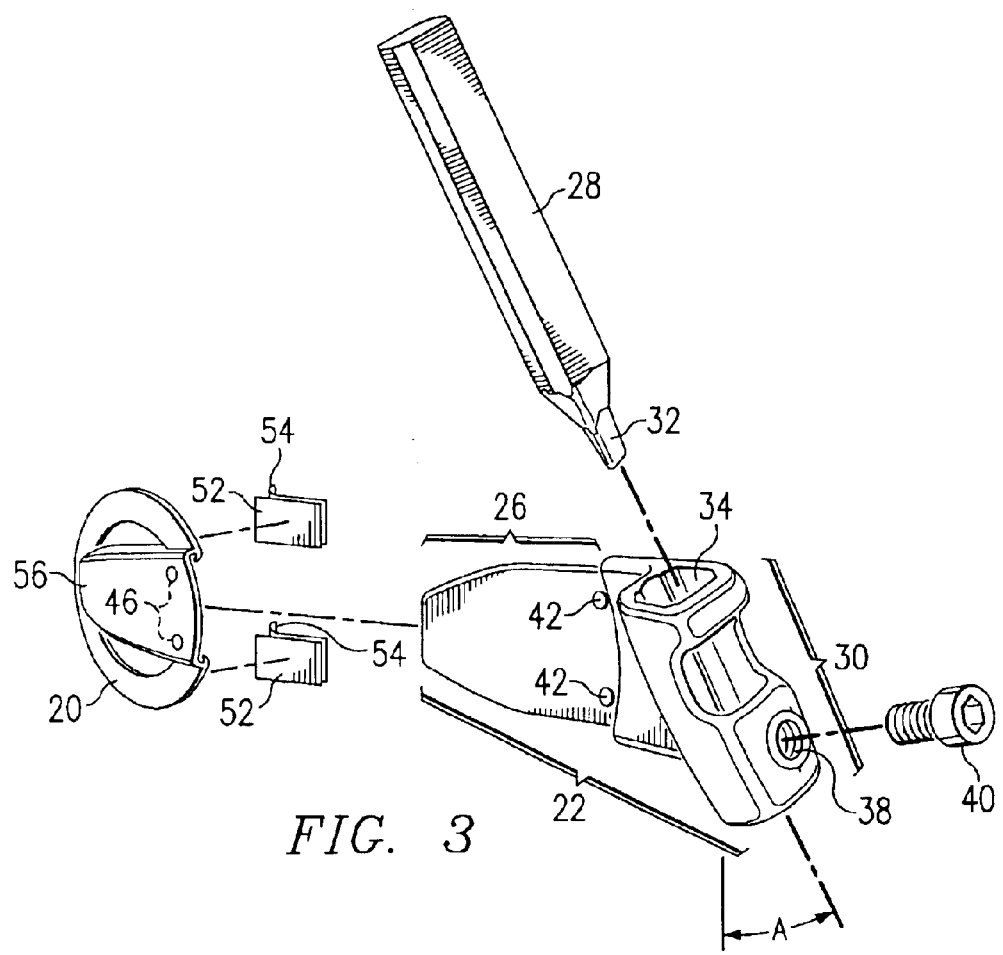
FIG. 3 shows an exploded view of the marking attachment.

Viewing FIG. 3, a marking instrument, such as a pen or pencil, and preferably a carpenter's pencil 28, is adjustably mounted on one end of the clip 22 by a carriage or holder 30. The holder 30 is angled forwardly angle "A" with respect to the normal and the rest of the clip 22 such that a tip 32 of the pencil projects forwardly away from the bottom of the tape measure 11 angle "A". The pencil is also angled laterally inward angle "B" toward the extended tape 14 (see FIG. 1). This multi-angular and spaced configuration provides clearance between the holder 30 and tape measure 10 so that the attachment 12 will fit a variety of tape measures 11.

Figure 7A:
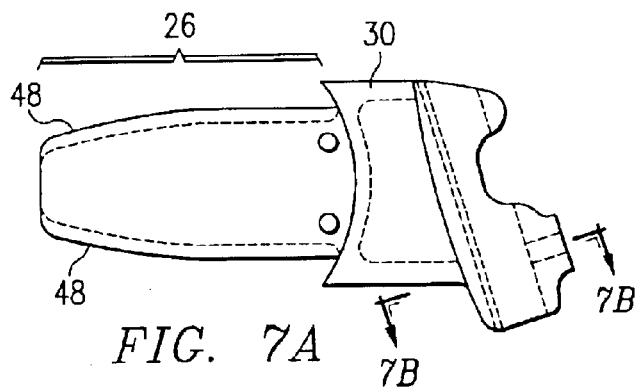
FIG. 7 shows a side view of the clip and cross sectional view of the holder.
Figure 7B:
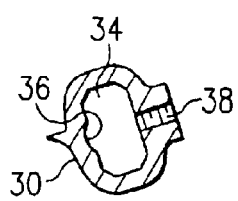
Figure 8:
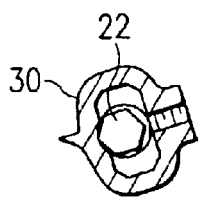
FIG. 8 shows a cross sectional view of the holder with two different marking instruments inside.

An inside cavity 34 of the holder 30 has a rectangular cross section with chamfered corners, much like a carpenter's pencil 28 (best shown in FIG. 7 Sec. B—B). One side of the cavity 34 has a concave furrow 36 running lengthwise that may accept a variety of marking instrument shapes. Opposite from furrow 36 in the front of the holder 30 is a threaded hole 38 that accepts a set screw 40. The set screw 40 adjustably engages and secures the pencil 28 in the holder 30.

Figure 5A:
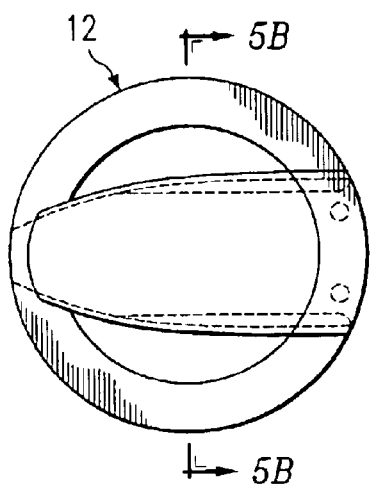
FIG. 5 shows a side and sectional view of the base of the marking attachment.
Figure 5B:
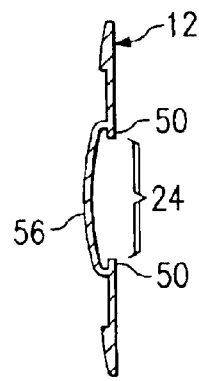
Figure 6:
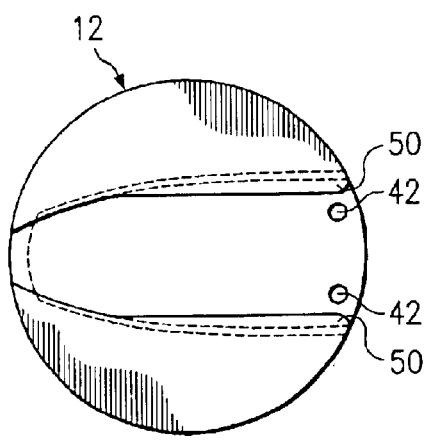
FIG. 6 shows a rear view of the base of the marking attachment.

Opposite the holder 30 of the clip 22 is the tongue 26. The tongue 26 has two semi-spherical projecting bumps 42 near where the tongue 26 connects to the rest of the clip 22. These bumps 42 are aligned vertically and near the top and bottom of the tongue. When the tongue 26 is inserted into the commensurate groove 24 in the base 20, the bumps 42 snap into corresponding recessed pits 46 in the base 20. The tongue 26 has opposing lips 48 on the top and bottom edges, as shown in FIG. 7, that are adapted to glide inside corresponding strips or ridges 50 of the groove 24 (see FIG. 5, sec. A—A).

Adhesive strips 52 are provided such that the base 20 is securely attached to a side of the tape measure 10. The adhesive strips 52 are protected temporarily by plastic backing strips 54 (FIG. 3) before the attachment 12 is mounted. In this embodiment the base 20 has a generally circular shape that fits most tape measures, but it can be most any shape. Also, it has a particularly thin cross section (FIG. 5, Sec. A—A) such that it does not protrude out from the tape measure more than necessary. This is convenient as many tape measures are held in a tool belt that is designed to just fit a tape measure. Excess thickness of the base would undesirably wedge tightly in a tool belt. The base 20 also has a smooth texture 56 on the outside so as to aid in slipping out of a tool belt.

Figure 4:
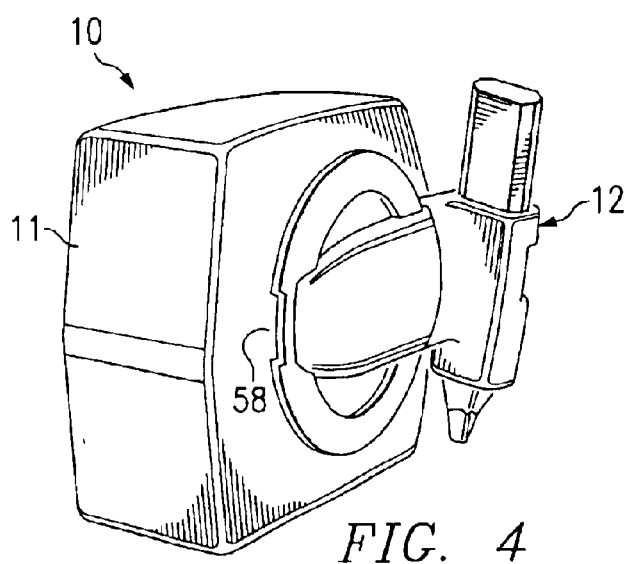
FIG. 4 shows a rear view of the tape measure and marking attachment.

FIG. 4 is a view showing and revealing an extension of the groove 24 that exits the base as a debris hole 58. The debris hole 58 provides for dirt, sawdust and the like to exit the groove 24, otherwise the tongue 26 could be prevented from fitting all the way in the base 20.

OPERATION

The installation of the invention is as follows. The combined base 20 and clip 22 (FIG. 1) is attached to the tape measure 11 by first peeling off the backing strips 54 (FIG. 3) from the adhesive strips 52 and positioning the base 20 on the side of the tape measure 11. The marking instrument or pencil is inserted into the holder 30 and secured by tightening the set screw 40. Positioning adjustments may be made to the pencil 28 by loosening the set screw 40 and sliding the pencil 28 in the holder 30. The pencil 28 may be removed for sharpening using the same method.

The removal of the clip 22 is accomplished by simply pulling it out from holder 20. At times the user might not want or need the marking attachment 12. Other times the pencil 28 may be used while still secured in the clip 22 and the clip 22 is detached from the base 20. Also, the clip 22 may be easily detached from the tape measure 11 while it is in a tool belt or clipped on a pocket or belt.

Marking is accomplished in several ways. One-handed marking is often necessary as a worker often has to hold on to tools, a ladder or scaffold. Traditionally, one hand holds the tape measure while the other marks with a pencil. This can be very awkward in many situations a worker finds himself in.

Advantageously, using this invention, a worker can use the extended tape and marker with the same hand. The mark can be made by striking the tip 32 of the pencil on a surface near the tape 14 at the desired measurement.

Figure 9:
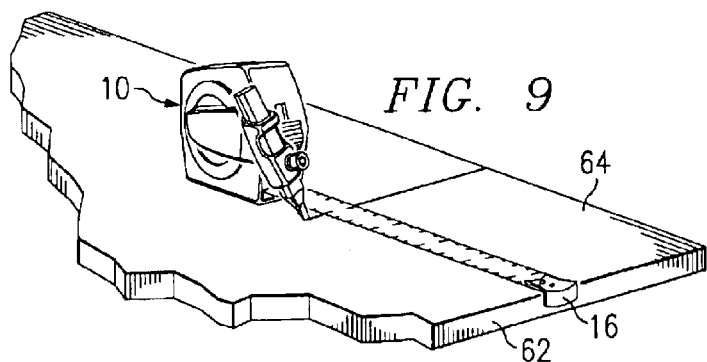
FIGS. 9–12 show different uses of the present invention.

Viewing FIG. 9, parallel slide marking may be accomplished by first locking the switch 18 at a with the tape 14 desired length. The whole assembly 10 is held perpendicular to an edge 62 of a board or sheet 64 with the tape catch 16 held on the edge 62 of the sheet 64. While holding the assembly perpendicular, a parallel line maybe drawn by sliding the assembly along the edge 62 and pressing the pencil tip onto the surface.

Figure 10:
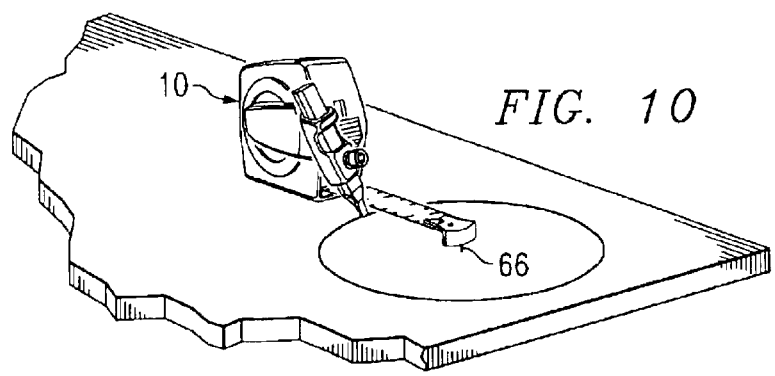

Viewing FIG. 10, circles and arcs may be made by pivoting the assembly around a point at the end of the tape. A screw or nail 66 may be used as a secured pivoting pin to hold the end of the tape 14.

Figure 11:
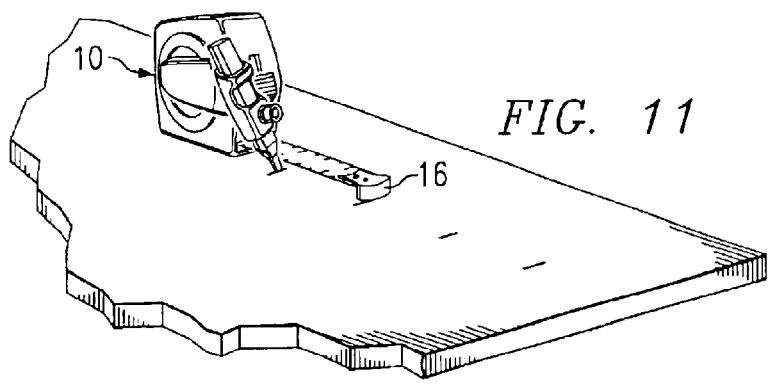

Viewing FIG. 11, index marking may be accomplished by locking the tape at the desired measurement. Index marking is accomplished by using an end to end method, placing the tape catch 16 on the last mark made and repeating over and over.

Figure 12:
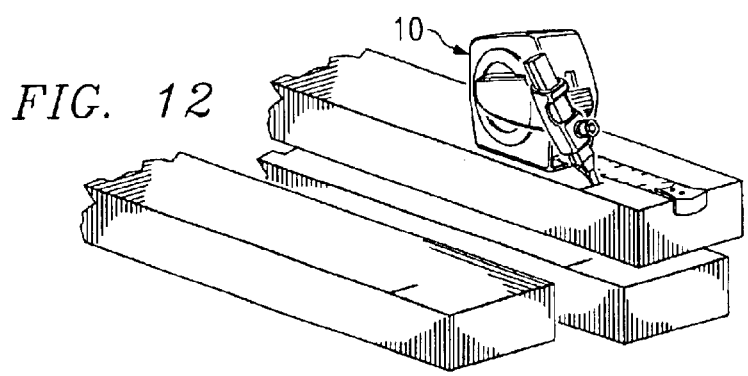

Viewing FIG. 12, multiple parts may be marked using the tape measure locked at the desired length.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A tool attachment, comprising:

a first support member adapted to secure to a tool; and a second support member adapted to hold a marker in a position being angled with respect to said first support member, wherein the second support member is adapted to be selectively secured to the first support member without requiring the use of tools to attach and detach said second support member, and wherein said first support member extends along a first axis, and said second support member is angled forward of said first axis an Angle A, and laterally of said first axis an angle B being greater than 0 degrees.

2. The tool attachment specified in claim 1 wherein the tool is a recoiling tape measure.

3. The tool attachment specified in claim 2 wherein the first support member is adapted to secure to a side of the tape measure.

4. The tool attachment specified in claim 3 wherein said first support member includes adhesive adapted to secure to the tape measure side.

5. The tool attachment specified in claim 1 wherein said second support member includes a securing mechanism adapted to selectively secure said marker with respect thereto.

6. The tool attachment specified in claim 5 wherein said securing mechanism includes a set screw.

7. A tool attachment, comprising:

a first support member adapted to secure to a tool; and a second support member adapted to hold a marker in a position being angled with respect to said first support member, wherein the second support member is adapted to be selectively secured to the first support member, wherein said first support member includes a slot, and said second member is adapted to be selectively and securingly received in said slot.

8. The tool attachment specified in claim 7 wherein said slot is adapted to extend parallel to said tape measure side when adapted thereto.

9. The tool attachment specified in claim 8 wherein said second support member includes a tongue adapted to be securingly received within said slot.

10. In combination;

a tool;

a first support member adapted to secure to the tool; and a second support member adapted to hold a marker in a position being angled with respect to said first support member, wherein the second support member is adapted to be selectively secured to the first support member without requiring the use of tools to attach and detach said second member, wherein said first support member extends along a first axis, and said second support member is angled forward of said first axis an Angle A, and laterally of said first axis an angle B being greater than 0 degrees.

11. The combination as specified in claim 10 wherein the first support member is adapted to attached to a recoiling tape measure.

12. The combination as specified in claim 11 wherein the first support member is adapted to secure to a side of the tape measure.

13. The combination as specified in claim 12 wherein said first support member includes adhesive adapted to secure to the tape measure side.

14. The combination as specified in claim 10 wherein said second support member includes a securing mechanism adapted to selectively secure said marker with respect thereto.

15. The combination as specified in claim 14 wherein said securing mechanism includes a set screw.

16. In combination:

a tool;

a first support member adapted to secure to the tool; and a second support member adapted to hold a marker in a position being angled with respect to said first support member, wherein the second support member is adapted to be selectively secured to the first support member, wherein said first support member includes a slot, and said second member is adapted to be selectively and securingly received in said slot.

17. The combination as specified in claim 16 wherein said slot is adapted to extend parallel to said tape measure side when adapted thereto.

18. The combination as specified in claim 17 wherein said second support member includes a tongue adapted to be securingly received within said slot.

* * * * *